US010832189B2

(12) United States Patent
Gupta et al.

(10) Patent No.: US 10,832,189 B2
(45) Date of Patent: Nov. 10, 2020

(54) SYSTEMS AND METHODS FOR DYNAMICALLY SCHEDULING TASKS ACROSS AN ENTERPRISE

(71) Applicant: ServiceNow, Inc., Santa Clara, CA (US)

(72) Inventors: Sanjay Gupta, Saratoga, CA (US); Venki Subramanian, Fremont, CA (US); Sarath Ambati, Union City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 260 days.

(21) Appl. No.: 15/588,122

(22) Filed: May 5, 2017

(65) Prior Publication Data

US 2018/0322442 A1 Nov. 8, 2018

(51) Int. Cl.
*G06Q 10/06* (2012.01)
(52) U.S. Cl.
CPC .......... *G06Q 10/063116* (2013.01); *G06Q 10/063112* (2013.01); *G06Q 10/063114* (2013.01)
(58) Field of Classification Search
CPC ... G06Q 10/063116; G06Q 10/064112; G06Q 10/063114
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,816,898 B1 | 11/2004 | Scarpelli |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |

(Continued)

*Primary Examiner* — Sujay Koneru

(74) *Attorney, Agent, or Firm* — Fletcher Yoder PC

(57) ABSTRACT

A system may include a processor that receives tasks to be performed, determines ordering rules associated with the tasks, and identifies a first set of employees to perform the one or more tasks based on schedule data associated with the employees and the ordering rules. The processor may then identify one employee of the first set of employees to perform the tasks based on a current schedule for the one employee and the ordering rules, identify scheduled tasks to remove from the current schedule based on un-assignment rules, and generate an adjusted current schedule to include the tasks and remove the scheduled tasks from the current schedule. The processor may then send a notification indicative of an adjusted current schedule to a computing device associated with the one employee.

18 Claims, 9 Drawing Sheets

(56) References Cited

U.S. PATENT DOCUMENTS

| | | |
|---|---|---|
| 7,925,981 B2 | 4/2011 | Pourheidari |
| 7,930,396 B2 | 4/2011 | Trinon |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,244,683 B2 | 7/2012 | Manos |
| 8,266,096 B2 | 9/2012 | Navarrete |
| 8,346,752 B2 | 1/2013 | Sirota |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,907,988 B2 | 12/2014 | Poston |
| 9,065,783 B2 | 6/2015 | Ding |
| 9,098,322 B2 | 6/2015 | Apte |
| 9,122,552 B2 | 9/2015 | Whitney |
| 9,239,857 B2 | 1/2016 | Trinon |
| 9,261,372 B2 | 2/2016 | Cline |
| 9,317,327 B2 | 4/2016 | Apte |
| 9,363,252 B2 | 6/2016 | Mueller |
| 9,534,903 B2 | 1/2017 | Cline |
| 9,535,737 B2 | 1/2017 | Joy |
| 9,631,934 B2 | 4/2017 | Cline |
| 9,645,473 B2 | 5/2017 | Miller |
| 9,654,473 B2 | 5/2017 | Miller |
| 9,766,935 B2 | 9/2017 | Keikar |
| 9,792,387 B2 | 10/2017 | George |
| 9,805,322 B2 | 10/2017 | Kelkar |
| 9,967,162 B2 | 5/2018 | Spinelli |
| 2002/0065700 A1* | 5/2002 | Powell ............... G06Q 10/06 705/7.14 |
| 2007/0185754 A1* | 8/2007 | Schmidt ............. G06Q 10/06 705/7.13 |
| 2009/0112677 A1* | 4/2009 | Rhett ................. G06Q 10/06 705/7.21 |
| 2009/0150209 A1* | 6/2009 | Levine ............... G06Q 10/06 705/7.13 |
| 2011/0161128 A1* | 6/2011 | Barney .............. G06Q 10/06 705/7.13 |
| 2012/0239451 A1* | 9/2012 | Caligor .............. G06Q 10/00 705/7.21 |
| 2013/0191836 A1* | 7/2013 | Meyer ................ G06F 9/4881 718/103 |
| 2014/0067455 A1* | 3/2014 | Zhang ................ G06Q 10/109 705/7.24 |
| 2014/0136255 A1* | 5/2014 | Grabovski ..... G06Q 10/063112 705/7.14 |
| 2015/0106145 A1* | 4/2015 | Hamilton ....... G06Q 10/063114 705/7.15 |
| 2015/0254596 A1* | 9/2015 | Nayar ........... G06Q 10/063112 705/7.14 |
| 2016/0300178 A1* | 10/2016 | Perry ............ G06Q 10/063112 |
| 2016/0364674 A1* | 12/2016 | Macatangay .... G06Q 10/06311 |
| 2017/0004460 A1* | 1/2017 | Fukuda .............. G06Q 10/1097 |
| 2017/0039505 A1* | 2/2017 | Prabhakara .... G06Q 10/063118 |
| 2018/0053127 A1* | 2/2018 | Boileau ............. G06Q 10/0631 |
| 2018/0096286 A1* | 4/2018 | Cook ............ G06Q 10/063116 |
| 2018/0322442 A1* | 11/2018 | Gupta ............ G06Q 10/063116 |

* cited by examiner

US 10,832,189 B2

SYSTEMS AND METHODS FOR DYNAMICALLY SCHEDULING TASKS ACROSS AN ENTERPRISE

TECHNICAL FIELD

The present disclosure relates in general to systems, methods, and apparatuses for dynamically assigning and re-assigning tasks for individuals to perform across an enterprise. More specifically, the present disclosure is related to systems and methods for dynamically assigning and re-assigning tasks based on various triggers.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In an enterprise or organization, different operations may be performed by different departments (e.g., human resources, information technology). Generally, certain members of an enterprise may be assigned tasks to perform over time. As time passes, members may receive additional tasks to perform, with the possibility that later assigned tasks may have a higher priority than those previously assigned. As the member receives additional tasks, it may be useful to coordinate the scheduling of each of the received tasks along with the previously existing tasks in a more efficient manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed above, different members of an enterprise may be tasked with performing different tasks. For example, a member that may be part of an information technology (IT) department of the enterprise may be tasked (e.g., assigned activity) with issuing a computer to a newly hired employee. As time passes, the member may receive an additional task that involves correcting an IT issue that causes a server system to go offline. The later-arising IT issue may be associated with a higher priority value, as compared to the issuance of the new computer. With this in mind, in certain embodiments, a scheduling system may receive data indicative of each task assigned to the respective member along with a priority value associated with each task. Based on the received data, the scheduling system may dynamically determine a new order in which the tasks should be performed. When determining the new order, in some embodiments, the scheduling system may determine un-assignment rules associated with each task to determine whether certain tasks may be un-assigned from the respective member and re-assigned to another member.

Additionally, when determining the new order, the scheduling system may analyze a current work schedule for the respective member to determine whether certain tasks present on the current work schedule can be un-assigned or moved based on respective priority as compared to a newly received task. Based on the priority data, the scheduling data, and other factors, the scheduling system may dynamically adjust the current work schedule of the respective member to accommodate the newly received task.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronics devices are interconnected within a distributed context. As more functions are performed by services using some form of distributed computing, the ability of IT devices and services to coordinate activities for different members across an enterprise increases. That is, different departments of an enterprise may be located in different places and may operate independent of each other at some level but may still benefit from coordinating certain activities and scheduling functionalities. Moreover, various members of an enterprise may span across different departments, locations, buildings, and the like. As such, efficiently assigning certain tasks to different members of the enterprise may prove to be a challenge. In the context of the present approach, even after a schedule of tasks are determined for members of an enterprise, additional tasks may be issued to the enterprise and the scheduling system may identify members to perform the additional tasks based on the priority of the additional tasks, the priority of the currently scheduled tasks, the schedules of the members, and the like. Indeed, by dynamically scheduling the tasks received the scheduling system, the members of the enterprise may efficiently serve the enterprise over time. Additional details with regard to the embodiments described herein will be discussed below with reference to FIGS. 1-10.

Figure 1:
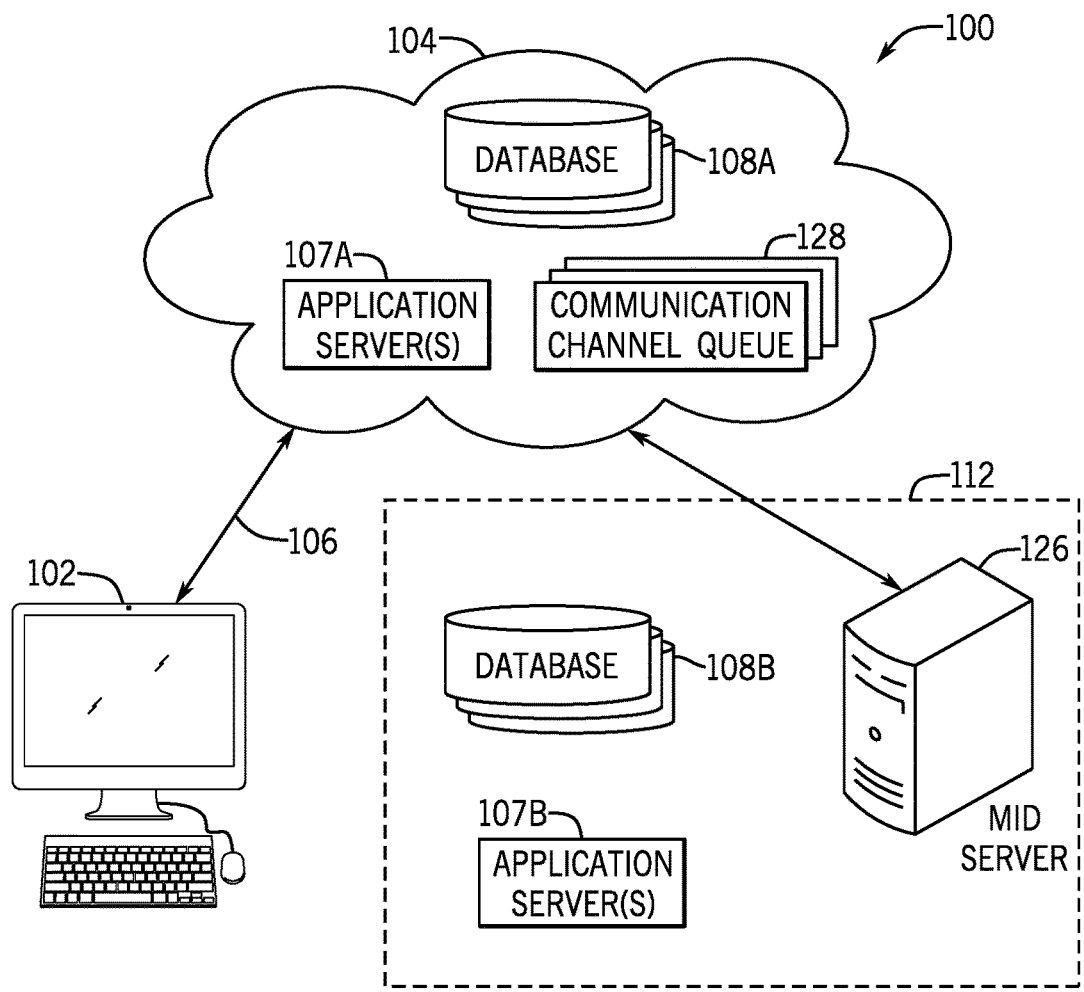
FIG. 1 is a block diagram of a generalized distributed computing system utilizing a cloud service, in accordance with an embodiment.

By way of introduction FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104, such as a cloud service platform, may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107A and/or one or more databases 108A via the platform 104. The application server 107A may include any computing system, such as a desktop computer, laptop computer, server computer, and/or any other computing device capable of providing functionality from an application program to the client 102. The application server 107A may include one or more application nodes running application programs whose functionality is provided to the client via the platform 104. The application nodes may be implemented using processing threads, virtual machine instantiations, or other computing features of the application server 107A. Moreover, the application nodes may store, evaluate, or retrieve data from the databases 108A and/or a database server.

The databases 108A may contain a series of tables containing information about assets and services controlled by a client 102 and the configurations of these assets and services. The assets and services include may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models).

In some embodiments, the databases 108A, whether in the cloud or at a client site accessible via the cloud or other network interconnection, may include information related to activity sets for certain personnel to perform. The databases 108A may each be associated with one or more departments of an enterprise. That is, an enterprise or organization may include a number of different departments that perform different operations for the overall enterprise. For instance, an IT department may assist in connecting information technology (IT) devices, software or applications, or virtualized environments for a member (e.g., employee) of the enterprise, human resources department may assist in hiring the member, and a facilities department may assist in providing access to various building associated with the member.

In addition to the databases 108A, the platform 104 may include one or more other database servers. The database servers are configured to store, manage, or otherwise provide data for delivering services to the client 102 over the communication channel 106. The database server may include one or more additional databases that are accessible by the application server 107A, the client 102, and/or other devices external to the additional databases. By way of example, the additional databases may include information related to member or assets of the enterprise. In some embodiments, the information regarding each member may be organized or stored a respective database of the databases 108A based on a department in which the member is assigned to. The information may include data regarding the member such as skill set, education background, role, job function, assigned tasks, location, demographic information, and the like.

In the depicted topology, access to non-cloud resources, such as database 108B and/or application server 107B, from the platform 104 is enabled via a management, instrumentation, and discovery (MID) server 126 via a communication channel queue 128 (e.g., an External Communications Channel (ECC) Queue). The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104.

The communication channel queue 128 may be a database table that is typically queried, updated, and inserted into by other systems. Each record in the communication channel queue 128 is a message from an instance in the platform 104 to a system (e.g., MID server 126) external to the platform 104 that connects to the platform 104 or a specific instance running in the platform 104 or a message to the instance from the external system. The fields of a communication channel queue 128 record include various data about the external system or the message in the record.

Although the system 100 is described as having the application servers 107, the databases 108, the communication channel queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, methods for populating the databases 108 may include directly importing data or entries from an external source, manual import by users entering or updating data entries via a user interface, and the like. Moreover, it should be understood that the embodiments described herein should not be limited to being performed with respect to a particular database or type of stored data. Instead, the present systems and techniques described herein may be implemented with any suitable database.

Figure 2:
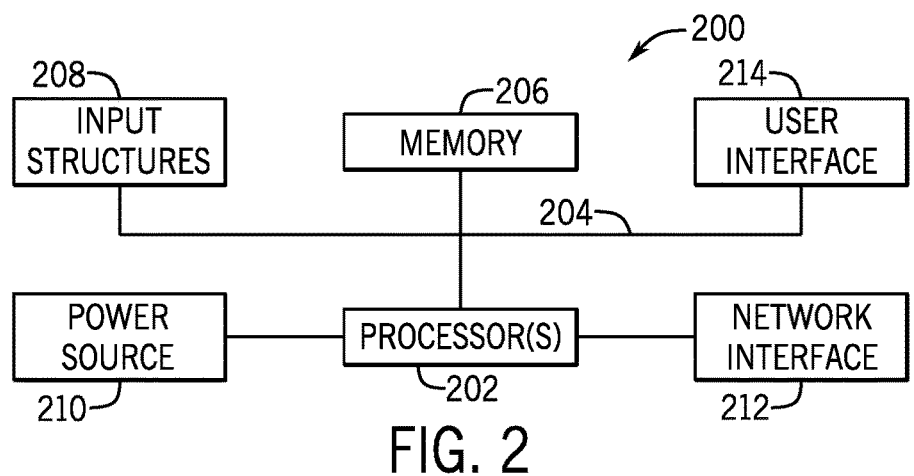
FIG. 2 is a block diagram of a computing device utilized in the distributed computing system of FIG. 1, in accordance with an embodiment.

In any case, to perform one or more of the operations described herein, the client 102, an application server 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel queue 128) or at a local or remote client site, a device running the MID server 126, and so forth. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other circuitry performing functions by executing instructions stored in the memory 206 or in other accessible locations. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Figure 3:
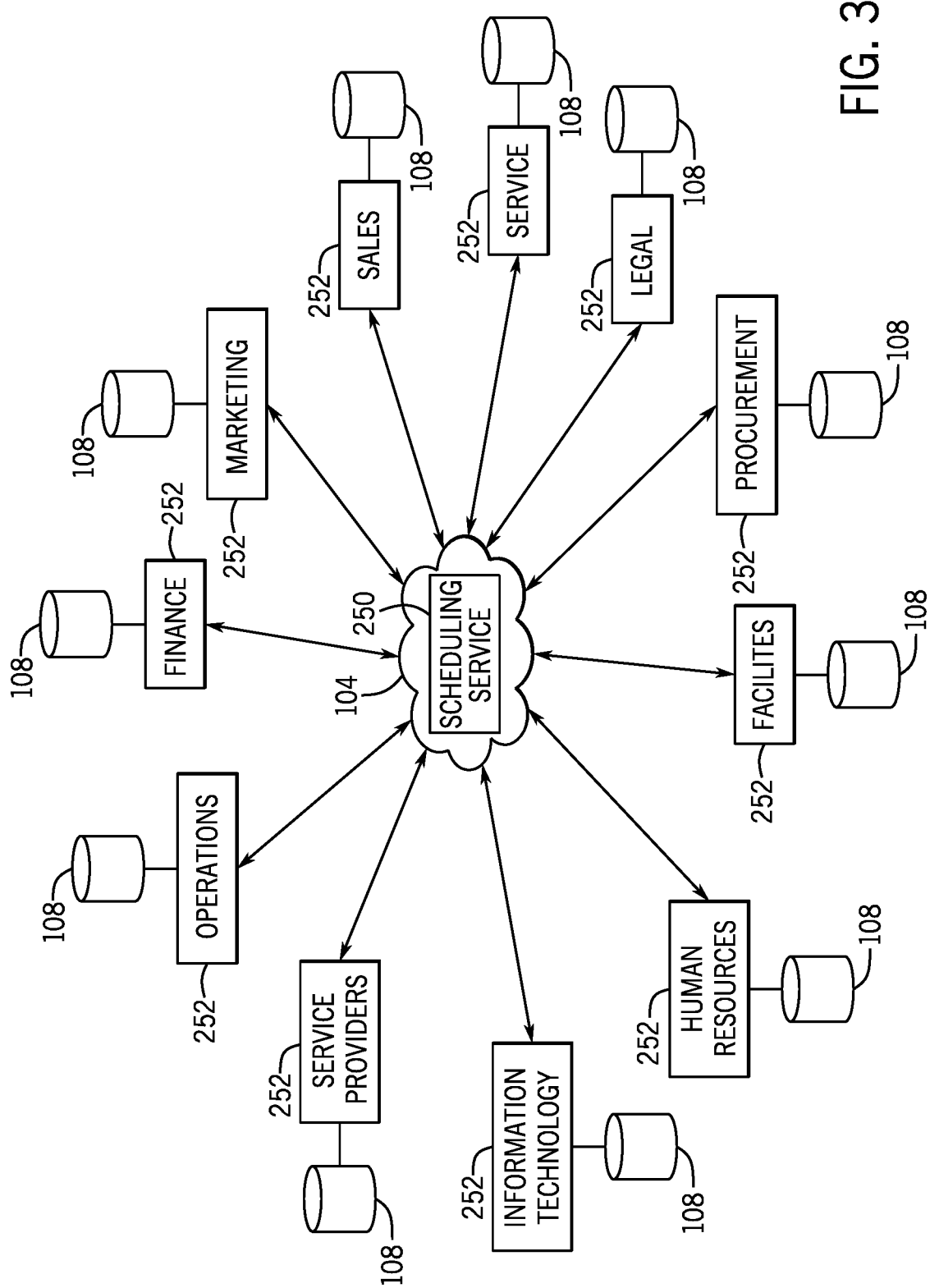
FIG. 3 is a block diagram of an example scheduling system that may be part of the distributed computing system of FIG. 1, in accordance with an embodiment.

With the foregoing in mind, FIG. 3 illustrates a block diagram of an example scheduling system 250 that may be communicatively coupled to different department server systems via the platform 104. As mentioned above, an enterprise or organization may be made up of a number of different departments, some or all of which may have data or resources accessible via the platform 104. In one embodiment, scheduling system 250 may be a computing device 200 or the like accessible to the platform 104. The scheduling system 250 may access different databases 108 associated with different departments to identify members of various departments to perform requested tasks that be received by the scheduling system 250. Each database 108 associated with a respective department may communicate with the scheduling system 250 via the platform 104 and a respective server system associated with the respective database. For example, FIG. 3 illustrates a number of server systems that may facilitate communication to, query requests, and the like with a respective database 108.

By way of example, the department server systems 252 may be associated with departments such as an operations department, a finance department, a marketing department, a sales department, a service department, a legal department, a procurement department, a facilities department, a human resources department, an information technology department, a service provider's department, and the like. Generally, a database 108 associated with each department may include data related to the members of the enterprise that are also part of the respective department, tasks or activities to be performed by the department, calendar information related to the events scheduled for the respective department or the respective members, and the like. In one embodiment, the data related to the members of the department may include a working schedule of the member, a list of skills of the member, a list of job functions performed by the member, and the like. The activities stored in a respective database associated with a respective department may include a schedule of tasks to be performed by a member of the respective department.

Referring briefly back to FIG. 3, each of the illustrated departments may perform different functions that contribute to the operation of the enterprise as a whole. For example, the finance department may be tasked with generating financial reports and financial forecasts for the enterprise. The marketing department may be tasked with generating marketing documents and strategies for the enterprise, products produced by the enterprise, and the like. The sales department may be tasked with coordinating sales effort to engage new business relationships for the enterprise. The service department may coordinate with existing clients of the enterprise to maintain products and services previously sold to the clients. The legal department may be tasked with ensuring that the enterprise conforms to the laws of the jurisdictions in which the enterprise operates. The procurement department may manage the distribution of supplies, products, and services to and from the enterprise. The facilities department may control access to different building owned and operated by the enterprise. The facilities department may also control the environmental conditions of each building and the maintenance operations for maintaining building structure and operations. In addition, the human resources department may manage the employment services provided to a member of the enterprise. For example, the human resources department may collect information regarding a new hire, coordinate benefits services provided to the new hire, and the like. The information technology (IT) department may manage the devices (e.g., printer, databases, server systems, computing devices) used by the member for the enterprise. The service providers department may coordinate with vendors and other organization that provide services to the enterprise. It should be noted that the foregoing list of departments should not be construed as an exclusive list of departments or a defined list of operations performed by the department; instead, the description of the departments are provided as examples and may include additional departments and additional operations and tasks for the described departments.

Given the number of different departments associated with a single enterprise, it may prove to be difficult to coordinate the scheduling of tasks to various members across the enterprise. For example, the IT department may receive a request that is related to a task to be performed by a member. In one embodiment, the scheduling system 250 may receive requests or tasks from the IT department to coordinate the scheduling of the received task. As such, the scheduling system 250 may acquire ordering rules associated with the received tasks, priority information related to the received tasks, skill sets associated with the received tasks, and the like. Using the collected information, the scheduling system 250 may query the databases 108 associated with the IT department and identify members who may be qualified to perform the received tasks. The scheduling system 250 may then analyze the schedules of the identified members to determine a subset of the identified members having schedules that allow for the received task to be performed by a requested time. In some embodiments, the schedules of the subset of members may not facilitate the received request. In this case, the scheduling system 250 may analyze priority data and un-assignment rules associated with the scheduled tasks for each member of the subset of members to identify certain scheduled tasks that may be un-assigned, re-assigned, or re-scheduled within the respective schedule. Un-assignment rules, as will be discussed below, may detail situations or conditions in which a respective task may be un-assigned or removed from a respective schedule of a respective member and returned to the scheduling system 250 for re-assignment to another member.

Generally, by employing the scheduling system 250 to coordinate the dynamic scheduling of tasks for members of the enterprise, the scheduling system 250 may support bulk or multiple assignment requests that may be received from a central dispatch system or other remote dispatch systems. Each requested task may be associated with an ordering rule that may include a priority level that corresponds to a weight factor or relative importance with respect to other requested tasks. The scheduling system 250 may include the ability to remove lower priority level tasks to incorporate higher priority level tasks in a schedule, re-assign scheduled tasks based on various triggers (e.g., target times achievable, member availability), and the like. As a result, the scheduling system 250 may dynamically alter one or more schedules of one or more members of an enterprise as new tasks are received by the scheduling system 250. By dynamically coordinating the scheduling of newly received tasks based on ordering rules and un-assignment rules, the scheduling system 250 may improve the performance and effectiveness of the completion of these tasks.

Figure 4:
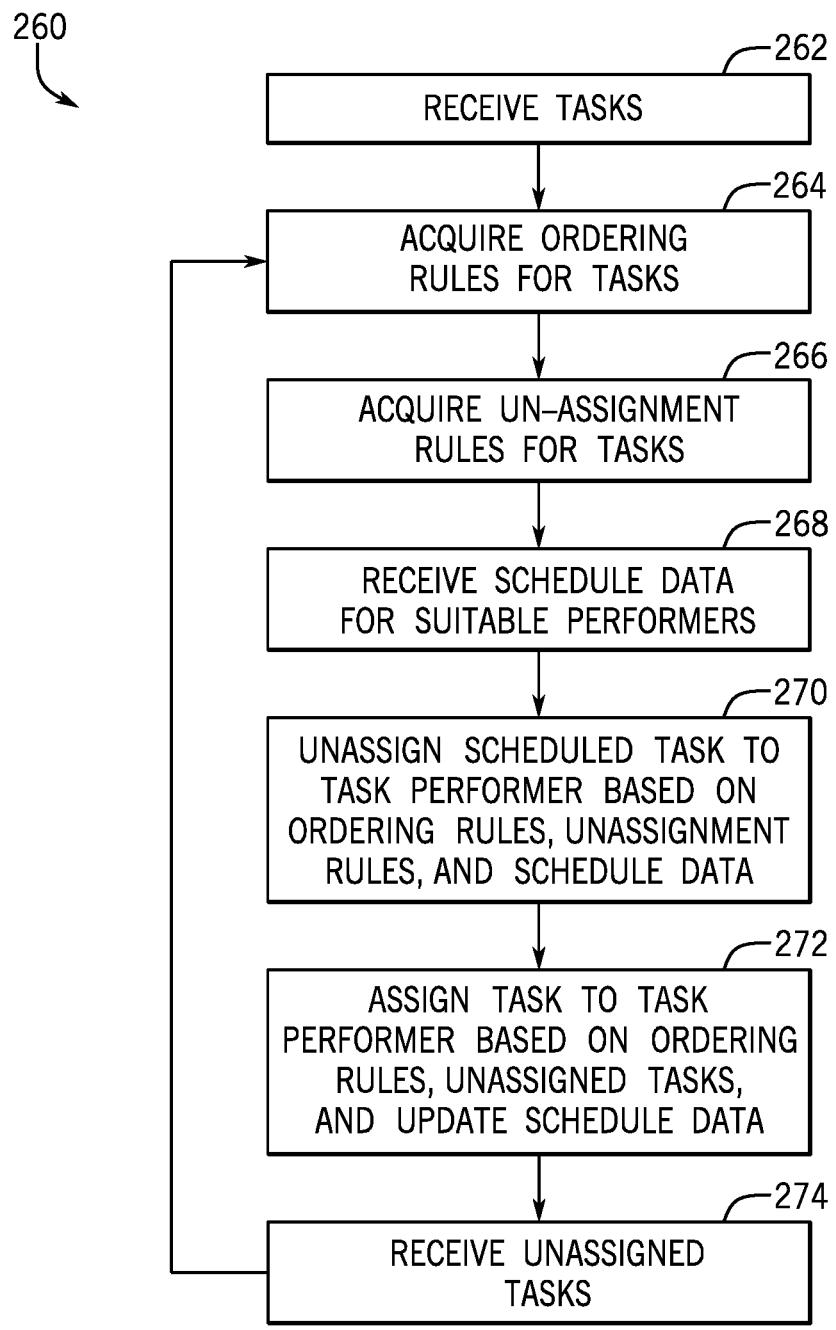
FIG. 4 is a flow chart of a method for dynamically scheduling tasks to members of an enterprise using the example scheduling system of FIG. 3, in accordance with an embodiment.

With the foregoing in mind, FIG. 4 illustrates a flow chart of a method 260 for coordinating the dynamic scheduling of tasks for members across an enterprise as new tasks are generated over time. It should be noted that the following description of the method 260 is a generic description of an example process that the scheduling system 250 may employ to dynamically schedule tasks for members of the enterprise to perform as new tasks are received. Additional details with regard to one implementation of how certain operations of the method 260 may be performed will be detailed below with reference to FIGS. 5-10. Although the following description of the method 260 is detailed in a particular order, it should be noted that the steps of the method 260 may be performed in any suitable order. Moreover, although the method 260 is described as being performed by the scheduling system 250, it should be understood that the method 260 may be performed by any suitable computing device, as described above.

Referring now to FIG. 4, at block 262, the scheduling system 250 may receive one or more tasks to be performed by one or more members of the enterprise. The tasks may be received from a central dispatch system that collects requests for services generated by members of the enterprise, clients of the enterprise, third party organizations associated with the enterprise, and the like. The tasks may also be received via an automatic assignment system that generates tasks based on certain trigger conditions being present. Trigger conditions may include an indication that one or more currently scheduled tasks may not be completed by a certain time (e.g., the member is behind schedule), an indication that the member will not perform any tasks for the scheduled time (e.g., member is out sick), an indication of a high priority asset (e.g., server, computing device) is not functioning, and the like. In addition to tasks generated by the automatic assignment system, tasks received by the scheduling system 250 may also include tasks that have been removed or re-assigned from a respective schedule of a member of the enterprise and may thus be re-assigned or rescheduled by the scheduling system.

In certain embodiments, the received tasks may include information (e.g., metadata) that provides context for the task with respect to the task's priority, ordering rules, un-assignment rules, re-assignment rules, and the like. For instance, each received task may receive a priority rating, such as priority 1, priority 2, and priority 3. In this example, priority 1 (P1) tasks may be higher than priority 2 (P2) and priority 3 (P3) tasks, and thus may be scheduled by the scheduling system 250 before scheduling P2 and P3 tasks. That is, the scheduling system 250 may receive tasks and order the tasks to be assigned or scheduled based on the respective priority levels.

In addition to priority levels, the ordering of scheduling tasks may be related to a service level agreement (SLA) due date or time. That is, the requester of the task may have a service level agreement with the enterprise. As such, the scheduling system 250 may query the databases 108 to determine whether the requester has an active SLA with the enterprise and determine an order rank for the respective task based on the guidelines specified by the requester's SLA.

The received tasks may also include data related to un-assignment rules. The un-assignment rules may detail conditions in which the respective task can and cannot be un-assigned by the scheduling system 250. The un-assignment rules may, for example, indicate that if the SLA due date is within a threshold amount of time (e.g., three hours), the respective task cannot be unassigned. In the same manner, the un-assignment rules may indicate that certain lower priority level tasks may be un-assigned at any given time.

Like the un-assignment rules, re-assignment rules may also be specified with respect to each received task. The re-assignment rules may be associated with certain triggers that cause a respective task to be re-assigned. The re-assignment triggers may include falling behind on a schedule, a member not capable of performing services, or the like. In some embodiments, the scheduling system 250 may regularly monitor (e.g., at set intervals) progress of a respective schedule of a member to estimate whether the member will finish scheduled tasks by scheduled deadlines. If the scheduling system 250 determines that a probability that the member will not complete scheduled tasks by a corresponding due time exceeds a specified threshold (e.g., 40%, 50%, 60%, and so forth), the scheduling system 250 may re-assign the task unless the task cannot be un-assigned due to associated un-assignment rules.

The received tasks may also include an expected task time, deadline, and other time-related properties. The expected task time may correspond to an expected amount of time that the task may take. The deadline may correspond to a due date or a date that the task is requested to be complete by.

The information or metadata regarding the priority, the ordering rules, the un-assignment rules, the re-assignment rules, and the task time may be specified by a user who generates the requested task. In one embodiment, the requested task may be generated via a client device 102 and provided to the application server 107, the scheduling system 250, or other suitable computing device via the platform 104 or other communication framework. The user may generate the requested task and provide the related information via the user interface 214 or some other suitable input device.

In any case, after receiving the requested tasks, at block 264, the scheduling system 250 may acquire ordering rules related to the received tasks. In one embodiment, the scheduling system 250 may query one of the databases 108 to determine ordering rules for the tasks. Alternatively, the scheduling system 250 may inspect the metadata of the received tasks to acquire ordering rules related to an order in which the tasks are to be performed. As mentioned above, the ordering rules may specify to the scheduling system 250 how to prioritize the received tasks. That is, the scheduling system 250 may use the ordering rules to determine an order in which the received tasks are to be performed. In addition, the ordering rules may be used to determine the order in which the received tasks are to be performed while also accounting for tasks already assigned to a respective member of the enterprise.

At block 266, the scheduling system 250 may acquire un-assignment rules for the tasks via the databases 108, the metadata of the received tasks, and the like. As discussed above, the un-assignment rules may specify certain conditions in which a respective task may be un-assigned or removed from a schedule of a respective member. By way of example, the un-assignment rules may specify that priority 3 (P3) tasks may be un-assigned to accommodate newly received tasks with higher priority levels.

At block 268, the scheduling system 250 may receive schedule data for member task performers. In one embodiment, each received task may be assigned or associated with one or more departments of the enterprise. As such, the scheduling system 250 may identify the one or more departments that each task may be associated with and determine which member(s) of the identified departments may be best suited for the respective task. Indeed, in addition to the department information, the received tasks may also include metadata indicative of skills sets, job functionalities, job titles, or the like of the member who is requested to perform the respective task.

Using the department information, the skill set information, and the like, the scheduling system 250 may query the databases 108 to identify one or more members suitable to perform the requested tasks. In addition to identifying the suitable members, the scheduling system 250 may retrieve one or more schedules that correspond to the identified members. The schedules may detail a list of tasks and times in which the times are scheduled to be performed by the respective member. The list of tasks may be organized according to a daily schedule, a weekly schedule, or any other suitable amount of time. The databases 108 may also include information related to the location of the respective member, a preferred language of the respective member, and other properties that may pertain to the ability of the respective member to perform a task.

After receiving the schedules of members who may potentially perform the tasks received at block 262, the scheduling system 250 may, at block 270, un-assign one or more scheduled tasks from a schedule of one of the identified members. The tasks un-assigned from the schedule of the member may be determined based on the ordering rules, the priority level of the received tasks, the un-assignment rules, and the schedule data of the member identified as suitable to perform the received tasks. In some embodiments, if the identified member's schedule includes time slot or window to perform the received task without un-assigning an existing task, the scheduling system 250 may not un-assign any tasks.

In any case, after determining whether tasks should be un-assigned from a schedule of a member to perform the received tasks, the scheduling system 250 may proceed to block 272 and assign the received task to the identified member. As such, the scheduling system 250 may incorporate the received task into the respective schedule of the identified member. In one embodiment, the scheduling system 250 may use updated schedule data for a member that has the scheduled tasks removed or un-assigned at block 270 to schedule the newly received tasks. In addition, the scheduling system 250 may account for the ordering rules and priority levels of the tasks present on the respective schedule with respect to the received task when incorporating the newly received task.

At block 274, the scheduling system 250 may receive any tasks that may have been un-assigned and proceed to block 264 to perform the method 260 and identify another member of the enterprise to perform the un-assigned task. After the scheduling system 250 updates the respective schedules of members, the scheduling system 250 may send the updated schedules to computing devices associated with the members. In one embodiment, after determining the updated schedule, the scheduling system 250 may send an alert or signal that may cause the computing device of a respective member to alert the member, open a scheduling application or program, or the like to indicate to the member the updated schedule. In some embodiments, to ensure that the member is notified of an update to the schedule, the alert or signal transmitted to the computing device may cause the application to execute or generate the alert when the computing device is in a standby mode, an offline mode, or the like.

By employing the method 260, the scheduling system 250 may dynamically schedule tasks to be performed by members as new tasks are automatically generated, manually created, un-assigned, or the like. The dynamic nature of the scheduling enables the enterprise to operate more effectively and efficiently by ensuring that tasks are regularly assigned to appropriate members while maintaining a perspective with regard to the priority and certain ordering rules associated with the tasks.

Figure 5:
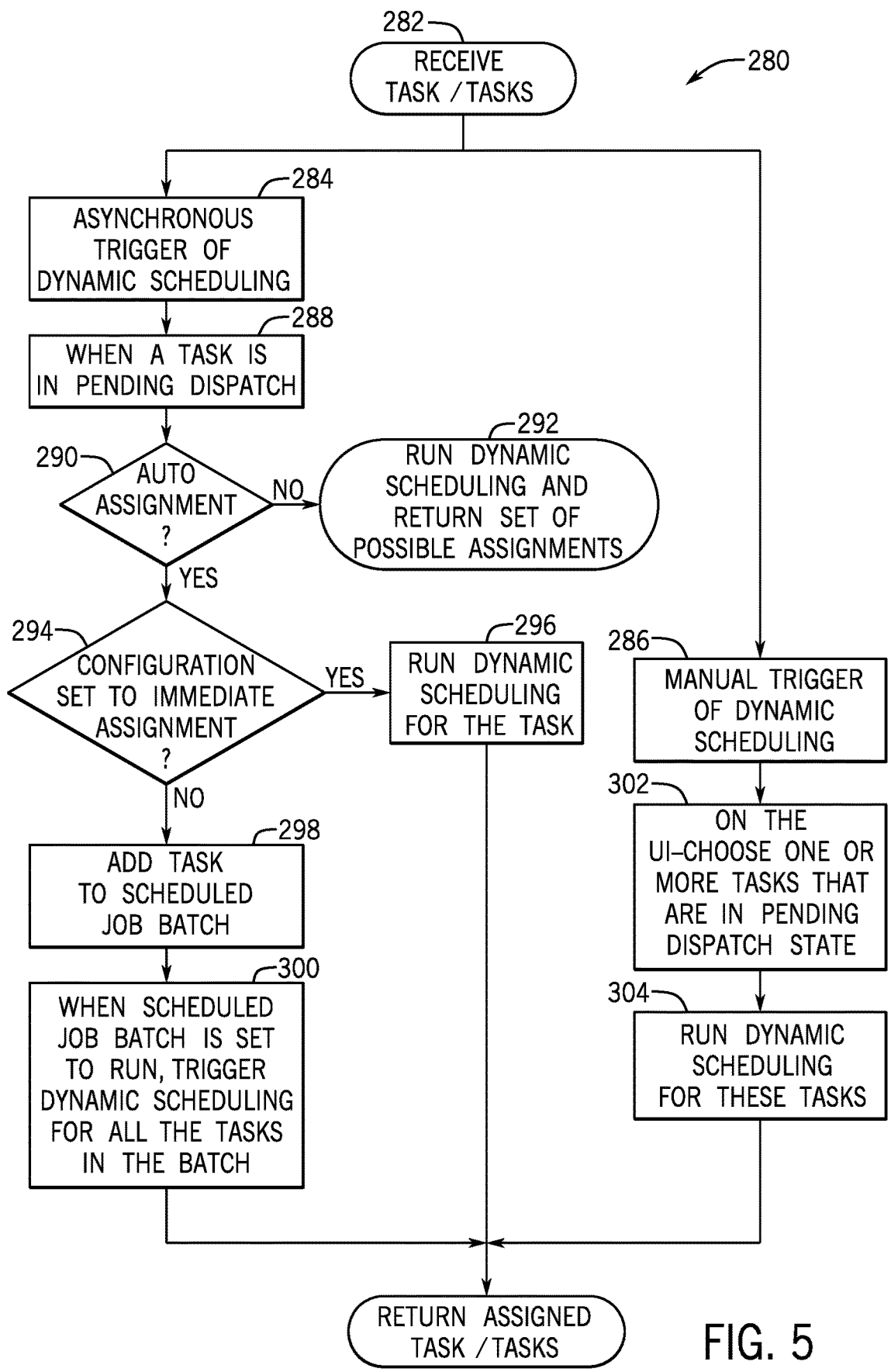
FIG. 5 is a flow chart of a method for automatically or manually scheduling tasks to members of an enterprise using the example scheduling system of FIG. 3, in accordance with an embodiment.

With the preceding in mind, FIG. 5 illustrates a flow diagram of a method 280 that the scheduling system 250 may employ when scheduling tasks to assign to members. The method 280 details how the scheduling system 250 may react or respond to an asynchronous trigger for dynamic scheduling of a task and a manual trigger for dynamic scheduling of a task. Although the method 280 will be described as being performed by the scheduling system 250, it should be understood that any suitably programmed computing device may perform the method 280.

Referring now to FIG. 5, at block 282, the scheduling system 250 may receive one or more tasks to be assigned to members of the enterprise. The reception of the tasks may be associated with an asynchronous trigger for dynamic scheduling (e.g., block 284) or a manual trigger of dynamic scheduling (e.g., block 286). The asynchronous scheduling of the dynamic scheduling of the received task(s) may include determining (e.g., block 288) whether the received task is pending in a dispatch from a central dispatch system, a remote dispatch system, or the like. In some embodiments, the dynamic scheduling of the task(s) may include other triggers such as an ordering rule associated with the task, a priority level of the task, an indication of a target department of task, an indication of the origination department of the task, and the like.

In one embodiment, the scheduling system 250 may determine (e.g., block 290) whether the received task is designated for automatic assignment. The received tasks may be designated as being automatically assigned within the metadata of the received task data. If the task is not designated for automatic assignment to a member, the scheduling task may execute (e.g., block 292) a dynamic scheduling workflow, as described above with reference to FIG. 4, to identify a set of members that may perform the requested tasks. If, however, the received task(s) is designated for automatic assignment, the determination may be made (e.g., block 294) whether the task is designated for immediate assignment. The designation for immediate assignment may be provided within the metadata associated with the requested task. The designation may be specified when the task is generated via manual input, priority level, or the like.

If the task is designated for immediate assignment, the scheduling system 250 may execute (e.g., block 296) the dynamic scheduling process described above with reference to FIG. 4. As such, the scheduling system 250 identify members suitable to perform the tasks and modify the member's schedule to incorporate the received task.

If the task is not designated for immediate assignment, the scheduling system 250 may add (e.g., block 298) the received task to a scheduled job batch. A scheduled job batch may include a collection of tasks assigned to a department or a number of members of the enterprise for performance. The scheduled job batch may be scheduled to be distributed to various members at a scheduled time, at a regular interval, or the like.

When the time in which the scheduled job batch is to be executed is reached, the scheduling system 250 may execute (e.g., block 300) the dynamic scheduling process described above with reference to FIG. 4 for each task specified in the job batch. By collecting a number of tasks and running the dynamic scheduling process for the collection of tasks, the scheduling system 250 may more efficiently distribute the tasks to various members of the enterprise and have more flexibility in identifying available members based on their respective schedules.

Referring back to the manual triggering of the dynamic scheduling mentioned above (e.g., block 286), after receiving the indication of manual triggering, the scheduling system 250 may receive (e.g., block 302) an input specifying one or more of the received tasks to dynamically schedule. That is, the scheduling system 250 may receive an input via a user interface or the like that instructs the scheduling system 250 to dynamically schedule selected tasks. After receiving this input, the scheduling system 250 may execute (e.g., block 304) the dynamic scheduling process described above with reference to FIG. 4 for the selected tasks.

Figure 6:
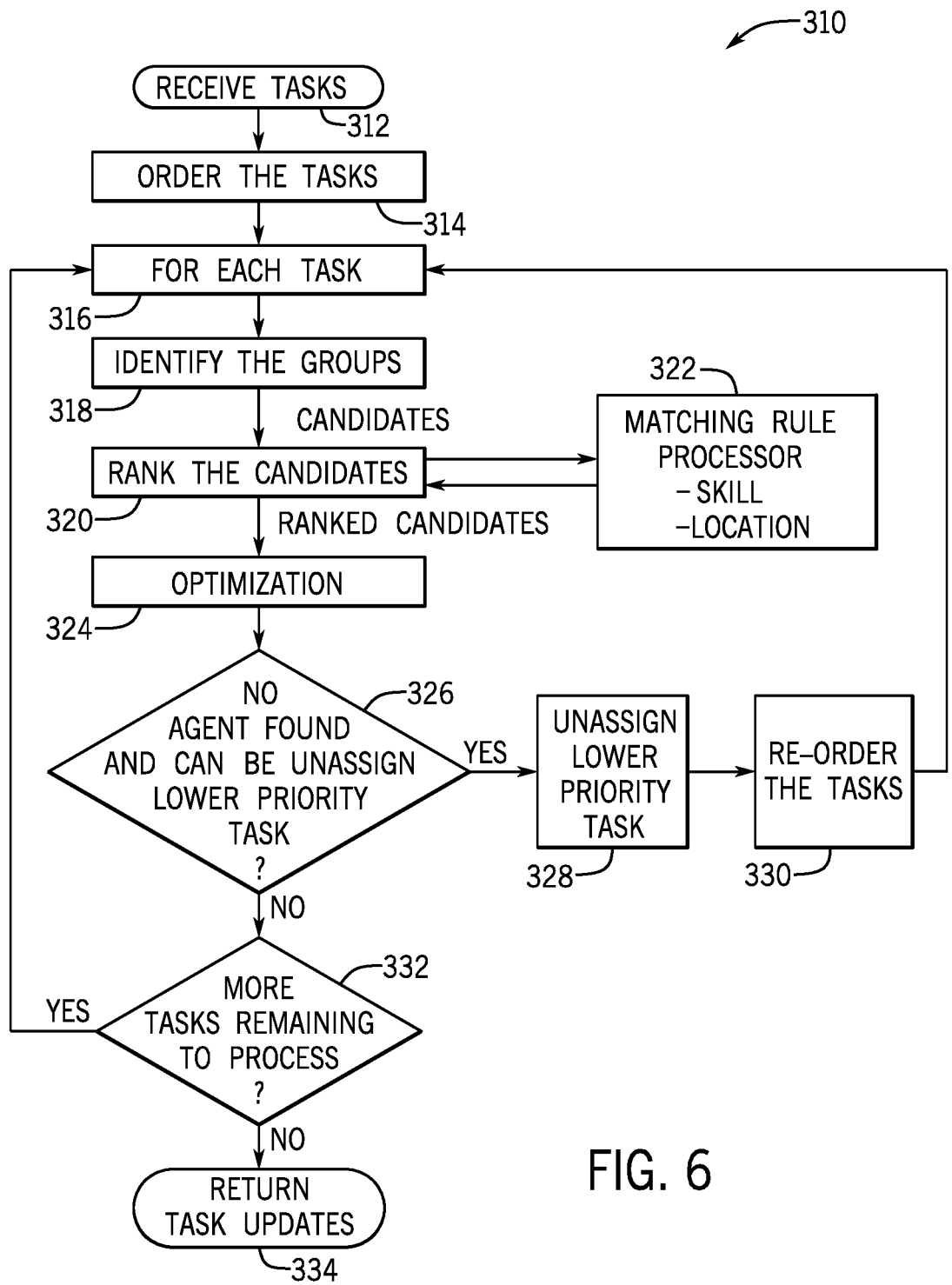
FIG. 6 is a flow chart of a method for identifying a member of an enterprise to assign tasks using the example scheduling system of FIG. 3, in accordance with an embodiment.

In certain embodiments, the dynamic scheduling of the received tasks may involve ordering the received tasks, identifying potential members to perform each task, unassigning tasks from a prospective member, and the like as discussed above. FIG. 6 illustrates an example flow diagram of a method 310 for dynamically identifying possible members or candidates to perform the tasks in accordance with embodiments described herein. Like the method 280 of FIG. 5, the method 310 may be performed by the scheduling system 250 or any other suitably programmed computing device.

Referring to FIG. 6, the scheduling system 250 may receive (e.g., block 312) one or more tasks to be assigned to a member of the enterprise. After receiving the tasks, the scheduling system 250 may arrange (e.g., block 314) the received tasks in an order based on the ordering rules and/or priority associated with the received tasks.

The scheduling system 250 may then analyze the first ordered task (e.g., block 316) and identify one or more groups of members or departments in which the respective task is associated with. That is, as discussed above, each received task may be associated with an operation to be performed by a certain group of members or a specific department of the enterprise based on the respective operation of the respective task.

In one embodiment, the scheduling system 250 may determine the group of members or department based on the operation requested by the respective task. That is, certain operations or tasks may be designated as being performed or assigned to a particular group of members or department. As such, the scheduling system 250 may determine whether the task or the operation defined by the task is associated with a particular group of members or department based on the operation. In one embodiment, a table or database 108 may detail how certain tasks may be associated with certain operations. In other embodiments, the user who generated the task may indicate the group of members or department that should perform the task when generating the respective task.

After identifying a subset of members of the enterprise that correspond to the group of members or department associated with the respective task, the scheduling system 250 may rank (e.g., block 320) the identified group of members or members that are associated with the identified department. That is, the scheduling system 250 may rank the possible candidates that may perform the respective task. In one embodiment, the scheduling system 250 may match (e.g., block 322) certain properties associated with the subset of members (e.g., candidates) with the respective task. For example, the scheduling system 250 may determine a location, a skill set, a set of certifications, a job title, a job function, or the like associated with a potential candidate that matches the operation request specified in the respective task. After identifying potential candidates that have a set of properties that match the operation request of the respective task, the scheduling system 250 may rank the potential candidates based on years of experience, a quantification of the extent to which the potential candidate's properties match the operation specification of the respective task, a rating of the potential candidate, and the like.

After ranking the potential candidates, the scheduling system 250 may optimize (e.g., 324) a schedule of one of the potential candidates to include the respective task. That is, the scheduling system 250 may analyze the current work schedule or current list of tasks to be performed for each potential candidate and identify one of the potential candidates who can perform the respective task in a timely manner that meets any time deadline specified by the requested task. Additional details with regard to the optimization process will be discussed below with reference to FIG. 7.

Generally, after the scheduling system 250 performs the optimization process described in greater detail with reference to FIG. 7, the scheduling system 250 may incorporate or assign the respective task to one of the potential candidate's schedule. As such, a computing device associated with the selected candidate may alert the selected candidate with regard to the updated schedule having the newly assigned task, as discussed above.

If, in certain circumstances, the scheduling system 250 does not identify a candidate or agent that can perform the respective task by the respective deadline, the scheduling system 250 may determine (e.g., block 326) whether certain scheduled tasks can be un-assigned from a respective candidate's schedule. That is, as discussed above, each task may be associated with certain un-assignment rules that specify when a respective task may be unassigned from the respective candidate's schedule.

After identifying tasks that may be unassigned, the scheduling system 250 may un-assign (e.g., block 328) one or more tasks currently assigned to the candidate having the un-assignable task(s). In one embodiment, the scheduling system 250 may un-assign or remove a task currently scheduled for the candidate based on whether the respective task has a higher priority or a deadline that is earlier as compared to the scheduled task.

The scheduling system 250 may then re-order (e.g., block 330) the scheduled tasks of the candidate who had a task un-assigned. The scheduling system 250 may then return to block 316 and determine whether the respective new task may be assigned to a candidate after the prior task is un-assigned.

After assigning the respective task to the candidate, the scheduling system 250 may determine (e.g., block 332) whether other received tasks are still to be assigned. If additional tasks are still to be assigned, the scheduling system may return to block 316 and perform the method 310 for the next task. If no additional tasks remain to be assigned, the scheduling system 250 may return (e.g., block 334) task updates. That is, the scheduling system 250 may generate a report or summary of each of the received task and provide an indication with regard to the assigned candidate and scheduled time. The report or summary may be transmitted to any suitable computing device and displayed via a respective display device or the like.

Figure 7:
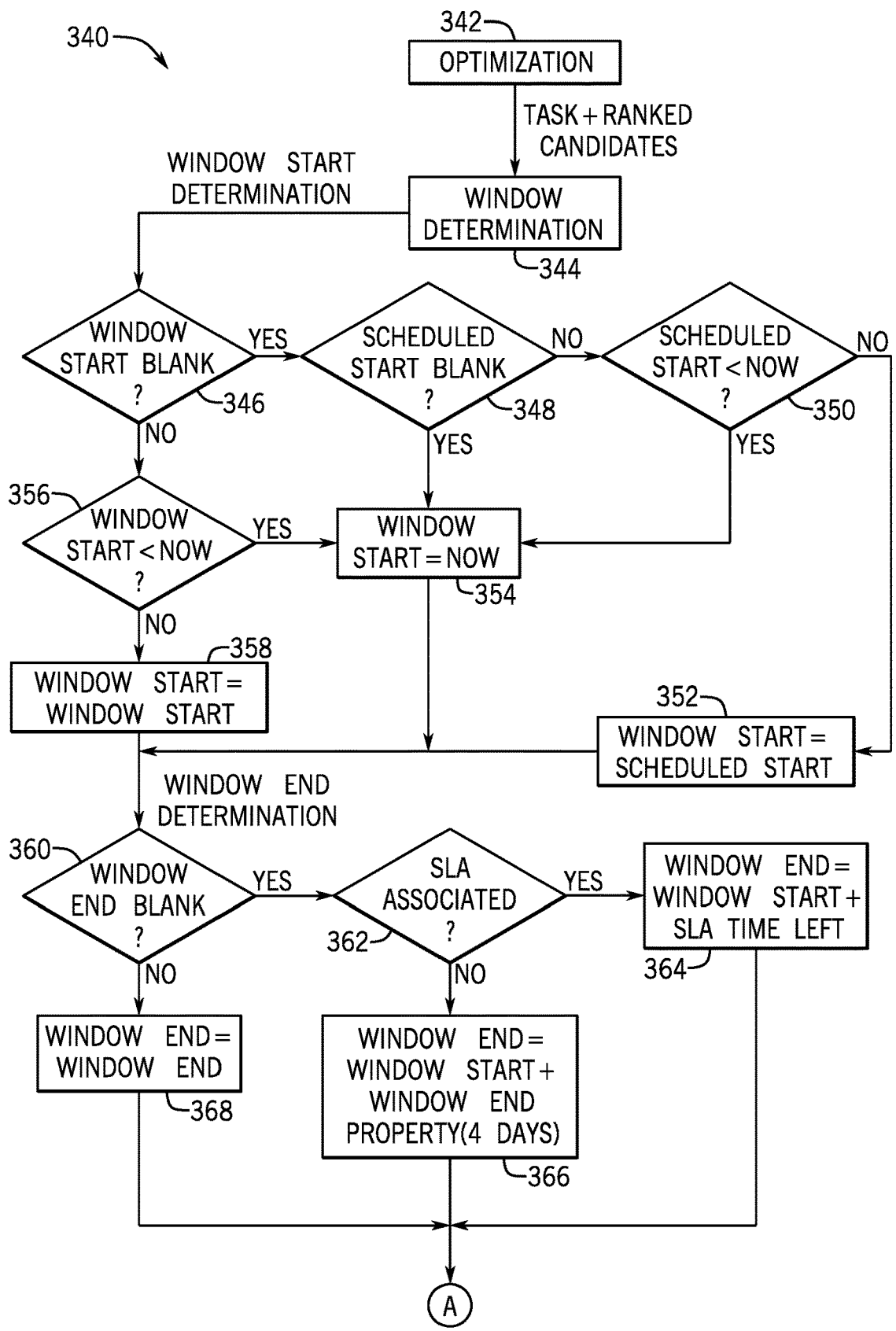
FIG. 7 is a flow chart of a method for adjusting schedules of members of an enterprise to perform various tasks using the example scheduling system of FIG. 3, in accordance with an embodiment.

With the foregoing in mind, FIG. 7 illustrates a method 340 for performing the optimization process referred to in the method 310. The optimization process may include identifying a work block or scheduled time to assign a received task in accordance with embodiments presented herein. As discussed above, although the following description of the method 340 is described as being performed by the scheduling system 250, it should be noted that any suitable computing device may perform the method 340.

Referring briefly to the method 310 of FIG. 6, the scheduling system 250 may optimize or identify work blocks of time for potential candidates to perform a received task after the identified candidates are ranked at block 320. In certain embodiments, the optimization process (e.g., block 324) may involve proceeding to block 324 of the method 340 of FIG. 7. Referring now to FIG. 7, the scheduling system 250 may receive the respective task and the ranked candidates determined at block 320 and begin determining (e.g., block 342) a window of time in which the received task is to be performed. The window time may correspond to a period or duration of time in which the received task may be scheduled to be performed.

Initially, the scheduling system 250 may determine a window start time. As such, the scheduling system 250 may determine (e.g., block 346) whether a start of a window for the received task is blank or empty. If the window start is blank or empty, the scheduling system 250 may determine (e.g., block 348) whether a scheduled start time of the respective task is blank or empty (e.g., unspecified). If the scheduled start is not blank, the scheduling system 250 may determine (e.g., block 350) if the scheduled start is prior to the current time. If the scheduled start is not prior to the current time, the scheduling system 250 may designate (e.g., block 352) the window start time as the scheduled start time for the respective task.

Referring back to block 330, if the scheduled start time is blank, the scheduling system 250 may designate (e.g., block 354) the window start time as the current time. In the same manner, with regard to block 350, if the scheduled start time is before the current time, the scheduling system 250 may designate (e.g., block 354) the window start time as the current time.

Referring back to block 346, if the scheduling system 250 determines that the window start is not blank, the scheduling system 250 may determine (e.g., block 356) whether the window start is prior to the current time. If the window start is prior to the current time, the scheduling system 250 may designate (e.g., block 354) that the window start is the current time. If the window start is prior to the current time, the scheduling system 250 may designate (e.g., block 358) the window start as the specified window start.

After the window start has been defined, the scheduling system 250 may determine the end time for the window. As such, the scheduling system 250 may determine (e.g., block 360) whether the work window of the candidate includes a blank or open ended time slot. If the window end is blank, the scheduling system 250 may determine (e.g., block 362) if a service level agreement (SLA) is present for the requester of the received task. The SLA may indicate whether the enterprise performing the task has an agreement in place to perform work or operations for the requester within a certain period of time. The scheduling system 250 may determine if an SLA is present by querying a database 108 that may include information indicative of SLAs associated with the enterprise.

If an SLA is present, the scheduling system 250 may determine (e.g., block 364) that the window end or the time in which the received task may be completed at the latest is the window start time plus the remaining time of the SLA. If an SLA is not present, the scheduling system 250 may determine (e.g., block 366) that the window end is the window start plus a window end property that may be specified by the received task. Referring back to block 360, if the window end is not blank, the scheduling system 250 may designate (e.g., block 368) the window end, as specified by the respective task, as the window end.

Figure 8:
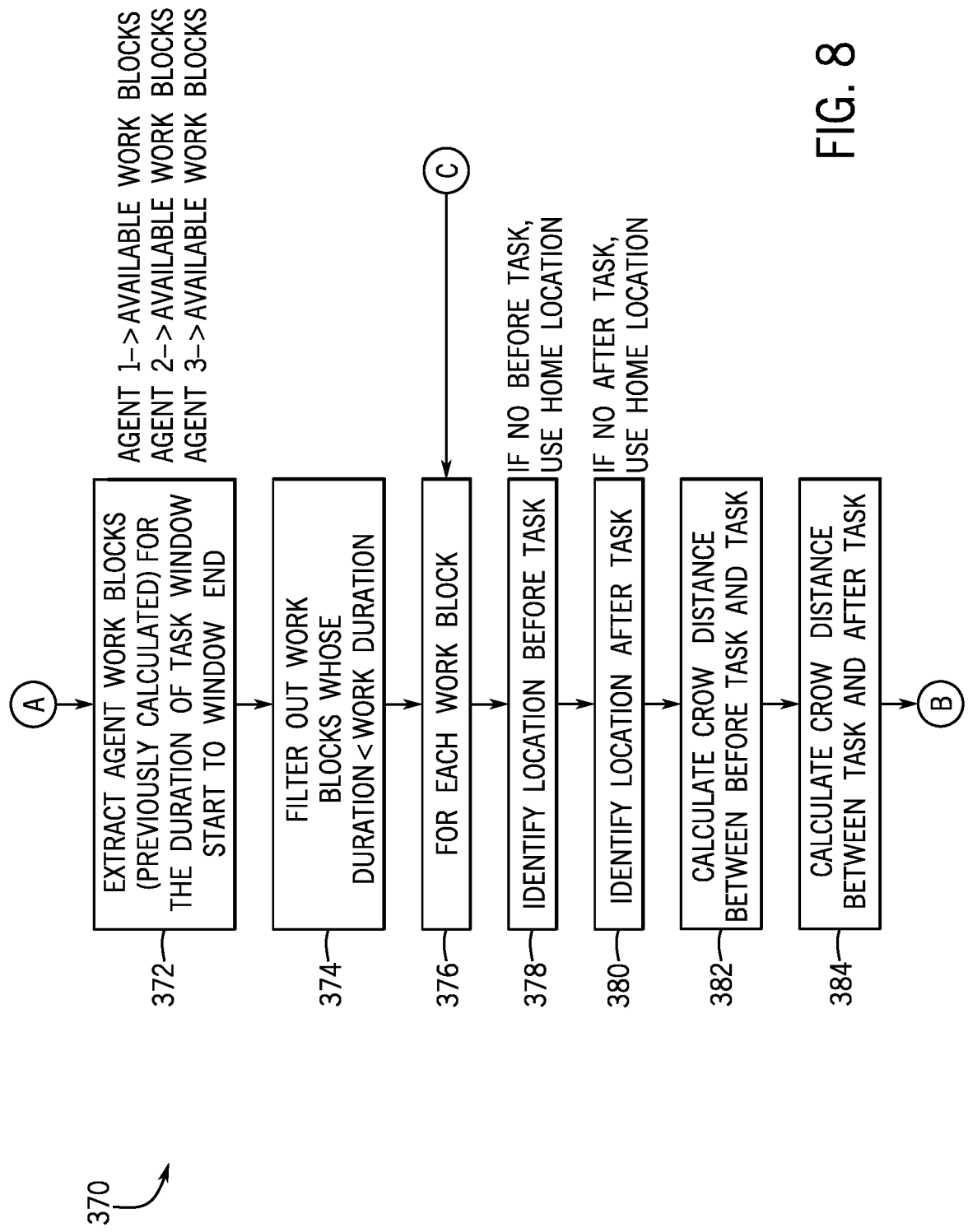
FIG. 8 is a flow chart of a method for adjusting schedules of members of an enterprise to perform various tasks using the example scheduling system of FIG. 3, in accordance with an embodiment.

After determining the window start time and the window end time in which the received task should be performed, the scheduling system 250 may proceed to method 370 of FIG. 8 to determine a work block of an identified candidate to use to perform the requested task. As discussed above, the method 370 may be performed by any suitably programmed computing device.

Referring to FIG. 8, the scheduling system 250 may extract (e.g., block 372) agent work blocks for the duration of a task window start to a task window end. The task window start may correspond to an earliest time in which the respective task may be performed and the task window end is the latest time in which the respective task may be performed.

Figure 9:
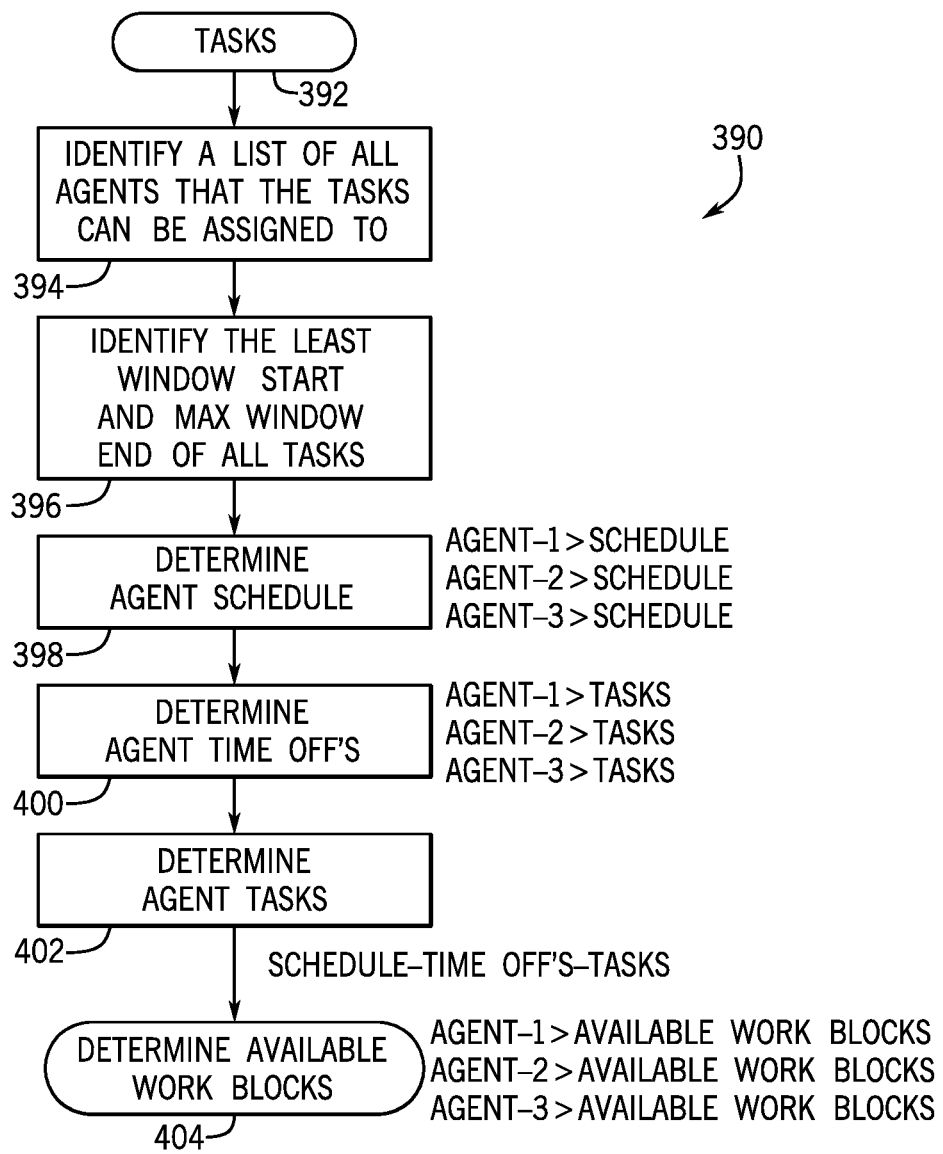
FIG. 9 is a flow chart of a method for adjusting schedules of members of an enterprise to perform various tasks using the example scheduling system of FIG. 3, in accordance with an embodiment.

When extracting agent work blocks for the duration of task window starts and ends, the scheduling system 250 may perform a method 390 as depicted in FIG. 9. Referring to FIG. 9, the scheduling system 250 may receive (e.g., block 392) the tasks from an automatic assignment system, a central dispatch system, a re-assignment system or the like.

Based on the information related to the respective task, the scheduling system 250 may identify (e.g., block 394) a list of candidates or agents that the respective task may be assigned to. That is, each respective task may be associated with a skill set or some other detail that identifies which members can be assigned the respective task. After identifying the list of agents that the received tasks may be assigned to, the scheduling system 250 may identify (e.g., block 396) a least window start and a max window end for the received tasks. That is, each task may be associated with an earliest start time and a latest end time. Based on the start times and end times for each received task, the scheduling system 250 may identify the earliest or least window start and the maximum or latest window end of the received tasks.

The scheduling system 250 may then retrieve (e.g., block 398) the identified agent's schedules from one or more databases 108 that correspond to the determined window. In addition, the scheduling system 250 may determine (e.g., block 400) the off time periods (i.e., time periods when tasks cannot be scheduled or performed) based on the schedules.

After retrieving the schedules of the identified candidates, the scheduling system 250 may determine (e.g., block 402) the currently scheduled tasks for each of the identified candidates. Based on the currently scheduled tasks, the scheduling system 250 may determine (e.g., 404) available work blocks or periods of time in which the identified candidate can perform new tasks.

Referring back to FIG. 8, after determining the available work blocks of the agents, the scheduling system may compare the amount of time expected to be involved in performing the respective task with the available work blocks. Based on this comparison, the scheduling system 250 may filter (e.g., block 374) or remove the work blocks that have less time available than the expected duration needed to perform the respective task. In certain embodiments, the scheduling system 250 may determine the expected duration for performing the respective task based on metadata or information provided with the respective task. Alternatively, the scheduling system 250 may consult information via the databases 108, such as historical service call information or statistics, that indicate expected amounts of time for various types of tasks to be performed.

After filtering the work blocks, the scheduling system 250 may, for each remaining work block (e.g., block 376), identify (e.g., block 378) a location that corresponds to a task scheduled to be performed before the respective task and identify (e.g., block 380) a location of a task scheduled to be performed after the scheduled task. If no task is scheduled before or after the respective task, the scheduling system 250 may use a default location, such as a home or office location associated with the identified candidate. In some embodiments, the location information of the candidates may be retrieved via a global-positioning system sensor or device disposed on the candidate, vehicle operated by the candidate, or based on known facility locations.

After determining the locations in which the candidate is expected before and after the respective task, the scheduling system 250 may calculate (e.g., 382) a nominal distance between the location of the task scheduled before the respective task and the location associated with the respective task. The location associated with the respective task may be defined within the data or metadata that corresponds to the received task. The nominal distance (e.g., crow distance) may correspond to a line or the shortest distance between two locations. In addition, the scheduling system 250 may calculate (e.g., block 384) a nominal distance between a location of the respective task and a location of the task scheduled to be performed after the respective task. Using the distances determined above, the scheduling system 250 may estimate an approximate amount of time for travel between the respective locations.

In some embodiments, the scheduling system may use a map API to calculate an estimated or expected travel duration between the location of the task scheduled before the respective task and the location of the respective task using the map API. The map API may determine the expected traffic conditions, route, and expected speed for various modes of transportation to determine the expected travel duration. Additionally, the scheduling system 250 may calculate a travel duration between a location associated with the respective task and the location associated with the task scheduled after the respective task in the same manner as described above.

Figure 10:
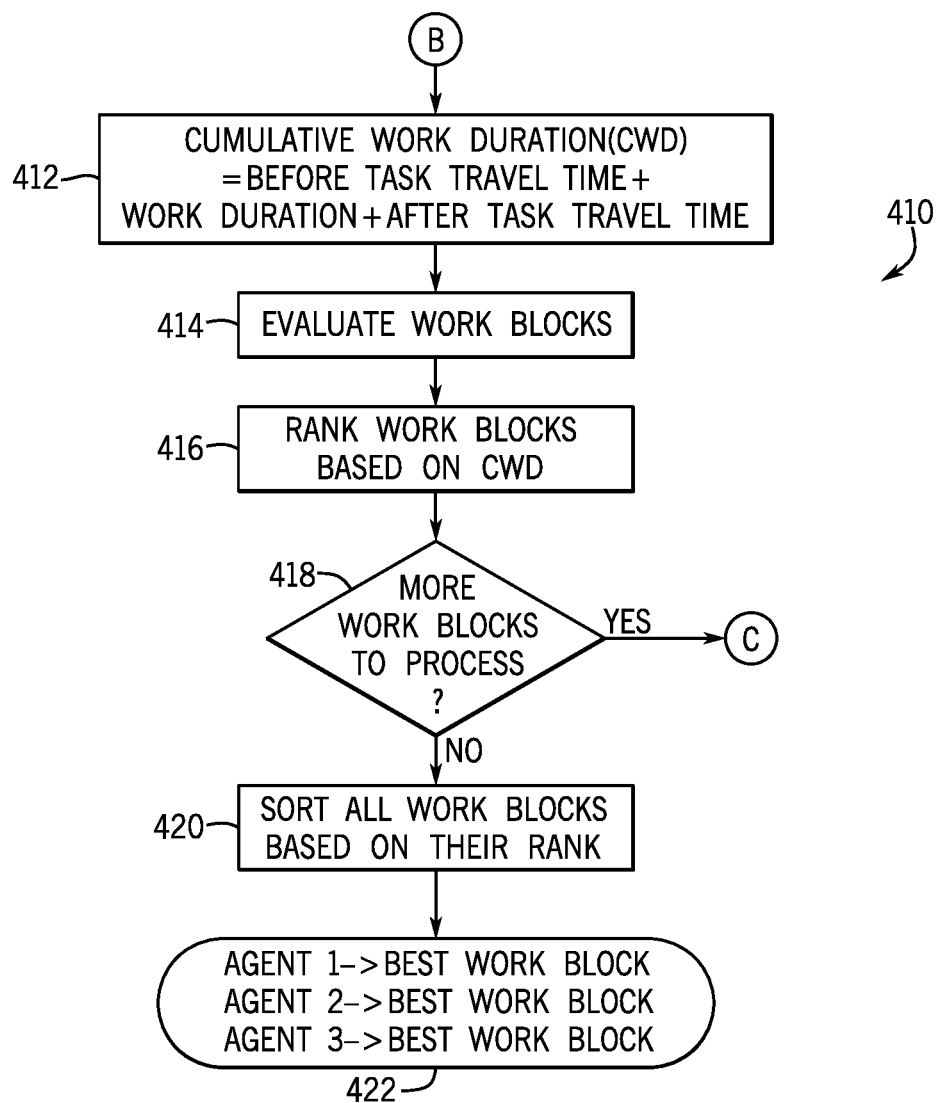
FIG. 10 is a flow chart of a method for adjusting schedules of members of an enterprise to perform various tasks using the example scheduling system of FIG. 3, in accordance with an embodiment.

Referring now to FIG. 10, the scheduling system 250 may continue the method 370 with the illustrated method 410. That is, after determining the amount of time to travel between the task scheduled before the respective task and respective task, in addition to the amount of time to travel between the task scheduled after the respective task and the respective task, the scheduling system 250 may determine (e.g., block 412) a cumulative work duration for the tasks scheduled to be performed by each identified candidate. The cumulative work duration may include a summation of the amount of time to travel between the task scheduled before the respective task and the respective task, an amount of time to travel between the task scheduled after the respective task and the respective task, and the expected duration of time to perform the respective task.

Based on the cumulative work duration, the scheduling system 250 may evaluate (e.g., block 414) the available work blocks to identify or rank (e.g., block 416) the work blocks of the identified candidates' schedules in which the respective task may be performed. After identifying the work blocks that may incorporate the respective task, the scheduling system 250 may rank the identified work blocks based on the cumulative work duration. That is, the scheduling system 250 may rank the identified work blocks based on which work block is capable of incorporating the respective task according to the cumulative work duration.

If additional work blocks are available to process (e.g., block 418), the scheduling system 250 may return to block 376 of FIG. 8 to retrieve another work block to process. If no other work blocks are present to process, the scheduling system 250 may sort (e.g., block 420) the work blocks of each identified candidate based on their ranks. The scheduling system 250 may then determine (e.g., block 422) a work block that is best suited to perform the respective task for each identified candidate. The results of the method 412 may then be presented via a display or stored in the database 108 for retrieval at a later time.

In some embodiments, after identifying the best suited work block for each candidate, the scheduling system 250 may send a notification or update one of the candidate's schedules to include the respective task at the best suited work block time. As such, the scheduling system 250 may dynamically schedule tasks as they are received.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function]...", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a processor configured to execute computer-executable instructions which, when executed cause the processor to:
receive a data entry corresponding to one or more tasks to be performed;
determine a plurality of ordering rules associated with the one or more tasks based at least in part on metadata related to the data entry;
determine if the one or more tasks are configured to be assigned individually based at least in part on the metadata related to the data entry;
in response to determining that the one or more tasks are not configured to be assigned individually, add the one or more tasks to a scheduled job batch comprising a plurality of tasks and configured to execute at one or more times, wherein the scheduled job batch, when executed, is configured to trigger scheduling for the plurality of tasks; and
in an individual assignment or the scheduled job batch, scheduling the one or more tasks by:
querying at least one database for a set of potential employees of a plurality of employees to perform the one or more tasks based on one or more types of the one or more tasks, employee qualifications, schedule data associated with the plurality of employees, and the plurality of ordering rules;
receiving a response indicative of the set of potential employees;
assigning a rank to each potential employee in the set of potential employees based on the one or more types of the one or more tasks and respective employee qualifications, wherein each potential employee in the set of potential employees is assigned different ranks for different types of the one or more tasks;
identifying an employee of the set of potential employees to perform the one or more tasks based at least in part on the rank for the employee, a current schedule for the employee, a location of the employee, one or more un-assignment rules, and the plurality of ordering rules, wherein the location of the employee is received from a global position system device, wherein the one or more un-assignment rules comprise conditions on which one or more scheduled tasks are un-assigned;
determining whether one or more deadlines to perform the one or more scheduled tasks are within a threshold amount of time of an un-assignment;
preventing the un-assignment of the one or more scheduled tasks in response to one or more deadlines being within the threshold amount of time of the un-assignment;
un-assigning the one or more scheduled tasks from the current schedule of the employee in response to an overlap of the one or more tasks with the one or more scheduled tasks and the one or more deadlines not being within the threshold amount of time of the un-assignment;
re-assigning the one or more scheduled tasks;

generating an adjusted current schedule to include the one or more tasks; and
sending a notification indicative of an adjusted current schedule to a computing device associated with the employee, wherein the computing device is configured to cause an application to generate an alert comprising the notification to notify the employee when the computing device is in a standby mode or an offline mode.

2. The system of claim 1, comprising the at least one database comprising data regarding the plurality of employees, wherein the data comprises information related to one or more skills, a location, a current schedule, a preferred language, or any combination thereof for each respective employee of the plurality of employees.

3. The system of claim 1, wherein the plurality of ordering rules comprises a priority rating for each of the one or more tasks.

4. The system of claim 1, wherein the plurality of ordering rules is stored within the metadata associated with the one or more tasks.

5. The system of claim 1, wherein the plurality of ordering rules is associated with a service level agreement.

6. The system of claim 1, wherein the computer-executable instructions which, when executed cause the processor to receive one or more re-assignment rules indicative of one or more triggers to cause the processor to un-assign the one or more tasks from the adjusted current schedule and re-assign the one or more tasks to another schedule associated with another employee of the plurality of employees.

7. The system of claim 6, wherein the one or more triggers comprise falling behind with respect to the adjusted current schedule, a determination that the employee does not have a skill set to perform the one or more tasks, or any combination thereof.

8. A system, comprising:
a non-transitory memory; and
one or more hardware processors configured to read instructions from the non-transitory memory to perform operations comprising:
collecting a plurality of tasks from a first auto-assignment dispatch and a central dispatch;
determining one or more ordering rules associated with a respective due date for each of the plurality of tasks;
determining a respective priority for each of the plurality of tasks based at least on the one or more ordering rules;
sorting the plurality of tasks based at least on the respective priorities for each of the plurality of tasks;
performing a first auto-assignment of the plurality of tasks to a plurality of agents based at least on the respective priorities by:
identifying an employee of a plurality of employees to perform one or more employee tasks of the plurality of tasks based on a current schedule for the employee, a location of the employee, and the one or more ordering rules, wherein the location of the employee is received from a global position system device;
determining whether one or more deadlines to perform one or more scheduled tasks on the current schedule are within a threshold amount of time of an un-assignment;
preventing the un-assignment of the one or more scheduled tasks in response to one or more deadlines being within the threshold amount of time of the un-assignment; and un-assigning the one or more scheduled tasks from the current schedule of the employee in response to an overlap of the one or more employee tasks with the one or more scheduled tasks and the one or more deadlines not being within the threshold amount of time of the un-assignment;

identifying the one or more scheduled tasks based on the first auto-assignment;

generating an adjusted current schedule to include the one or more employee tasks;

sending a notification indicative of the adjusted current schedule to a computing device associated with the employee, wherein the computing device is configured to cause an application to generate an alert comprising the notification to notify the employee when the computing device is in a standby mode or an offline mode; and returning the one or more scheduled tasks to a sorted plurality of tasks for a second auto-assignment.

9. The system of claim 8, wherein the first auto-assignment dispatch is configured to transmit the one or more scheduled tasks to the one or more hardware processors after the one or more scheduled tasks are un-assigned from the current schedule.

10. The system of claim 8, wherein the operations comprise un-assigning the one or more scheduled tasks based on one or more un-assignment rules associated with the one or more scheduled tasks.

11. The system of claim 10, wherein the one or more un-assignment rules are indicative of one or more conditions in which a respective task may be un-assigned.

12. The system of claim 8, wherein performing the first auto-assignment of the plurality of tasks comprises retrieving a plurality of current schedules including the current schedule associated with the plurality of agents and identifying at least one work block within the plurality of current schedules to perform the one or more employee tasks.

13. The system of claim 8, wherein performing the first auto-assignment of the plurality of tasks comprises identifying at least one agent of the plurality of agents that is located within a proximity with respect to a location in which the one or more employee tasks are to be performed.

14. The system of claim 13, wherein the operations comprise retrieving a second location of the at least one agent via the global position system device.

15. A method, comprising:
receiving, via a processor, a data entry corresponding to one or more tasks to be performed;

determining, via the processor, a plurality of ordering rules associated with the one or more tasks based at least in part on metadata related to the data entry;

determining, via the processor, if the one or more tasks are configured to be assigned individually based at least in part on the metadata related to the data entry;

in response to determining that the one or more tasks are not configured to be assigned individually, adding, via the processor, the one or more tasks to a scheduled job batch comprising a plurality of tasks and configured to execute at one or more times, wherein the scheduled job batch, when executed, is configured to trigger scheduling for the plurality of tasks; and in an individual assignment or the scheduled job batch, scheduling, via the processor, the one or more tasks by:
querying at least one database for a set of potential employees of a plurality of employees to perform the one or more tasks based on one or more types of the one or more tasks, employee qualifications, schedule data associated with the plurality of employees, and the plurality of ordering rules;

receiving a response indicative of the set of potential employees;

assigning a rank to each employee of the set of potential employees based on the one or more types of the one or more tasks and respective employee qualifications, wherein each potential employee in the set of potential employees is assigned different ranks for different types of the one or more tasks;

identifying an employee of the set of potential employees to perform the one or more tasks based on the rank for the employee, a current schedule for the employee, a location of the employee, one or more un-assignment rules, and the plurality of ordering rules, wherein the location of the employee is received from a global position system device, wherein the one or more un-assignment rules comprise conditions on which one or more scheduled tasks are un-assigned;

determining whether one or more deadlines to perform the one or more scheduled tasks are within a threshold amount of time of an un-assignment;

preventing the un-assignment of the one or more scheduled tasks in response to one or more deadlines being within the threshold amount of time of the un-assignment;

un-assigning the one or more scheduled tasks from the current schedule of the employee in response to an overlap of the one or more tasks with the one or more scheduled tasks and the one or more deadlines not being within the threshold amount of time of the un-assignment;

re-assigning the one or more scheduled tasks;

generating an adjusted current schedule to include the one or more tasks; and sending a notification indicative of an adjusted current schedule to a computing device associated with the employee, wherein the computing device is configured to cause an application to generate an alert comprising the notification to notify the employee when the computing device is in a standby mode or an offline mode.

16. The method of claim 15, comprising retrieving, via the processor, data indicative of the current schedule for the employee from one or more databases.

17. The method of claim 16, wherein the data comprises information related to one or more skills, a location, a current schedule, a preferred language, or any combination thereof for each respective employee of the plurality of employees.

18. The method of claim 15, wherein the plurality of ordering rules comprises a priority rating for each of the one or more tasks.

* * * * *